V. WILDNER.
DEMOUNTABLE TIRE.
APPLICATION FILED NOV. 5, 1909.
970,005.
Patented Sept. 13, 1910.
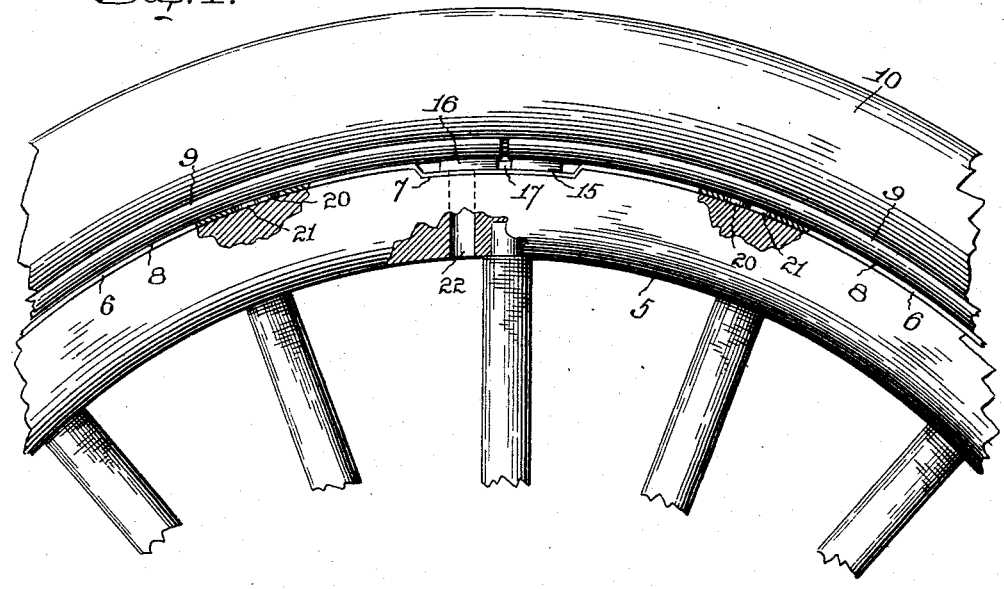
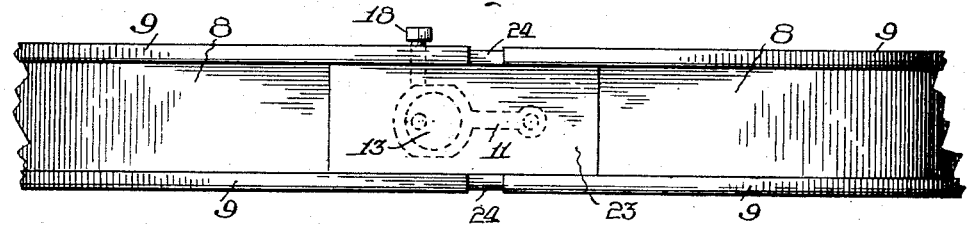
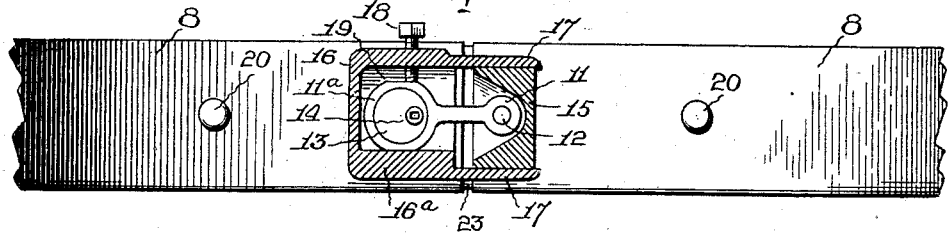

UNITED STATES PATENT OFFICE.

VALENTINE WILDNER, OF CHICAGO, ILLINOIS.

DEMOUNTABLE TIRE.

970,005.  Specification of Letters Patent.  Patented Sept. 13, 1910.

Application filed November 5, 1909. Serial No. 526,445.

*To all whom it may concern:*

Be it known that I, VALENTINE WILDNER, a citizen of the United States, residing at Chicago, in the county of Cook and State of Illinois, have invented a Demountable Tire, of which the following is a specification.

This invention is an improvement in vehicle-wheels, of that particular class which are provided with pneumatic-tires and in which the tire and a supplemental rim carrying the same are both demountable from the wheel for greater convenience in substituting one tire for another.

In the operation of motor-vehicles or automobiles it is customary to carry one or more extra tires for the purpose of replacing any tire or tires that may become deflated by puncture or other injury, and in order to facilitate the operation of replacing a tire it has been proposed to supply the tires with supplemental rims, so that each extra tire may be carried inflated on the rim and ready for use as soon as it is slipped or fitted upon the wheel.

The principal object of my invention is to provide the supplemental rim which carries the tire with means for expanding and contracting the same, in connection with locking means, whereby when said rim is expanded it may be readily and conveniently slipped upon the wheel, and when contracted thereon and locked will be firmly and securely held in place.

Other objects and advantages of the invention will hereinafter appear in the specifications, and what I claim as novel will be specifically set forth in the appended claims.

In the accompanying drawings, which form a part of this specification:—Figure 1 is a side elevation of a section of a vehicle-wheel, showing the application of my invention thereto. Fig. 2 is a plan view of the supplemental rim, the tire being removed, and the rim shown expanded. Fig. 3 is an inverted plan view of the supplemental rim, the same being shown contracted.

Like numerals of reference indicate like parts in all the figures of the drawings.

In the present instance I have shown my invention applied to a wooden wheel, in which the felly 5 thereof is provided circumferentially with a thin metal rim 6, the felly having a recess 7, in which the metal rim is depressed, as shown in Fig. 1, to receive certain parts of my invention hereinafter described. Upon this wheel is adapted to fit a supplemental metal rim 8, having the usual inturned edge flanges 9 which engage or clench the inner edges of the tire 10 to connect the same securely to the rim when the tire is inflated, said rim and tire being together detachable or demountable from the wheel, as will be understood.

In carrying out my invention the supplemental rim 8 is separated transversely at one point, so that it may be expanded and contracted for application to the wheel, and for the purpose of expanding and contracting said rim I provide a connecting link 11, pivoted at one end to one of the meeting ends of the rim, by a pin 12, and provided at its other end with a ring 11ª in which turns an eccentric or cam 13, the latter turning on a pivot 14 mounted in the other meeting end of the rim and having a square socket at its lower end to receive a key. In this manner, as will be seen, when the eccentric or cam is turned in one direction, or to the right, the ends of the supplemental rim will be separated, expanding said rim, as shown in Fig. 2, and when the eccentric or cam is turned in the other direction, or to the left, it will draw upon the link and bring the ends of the rim together, contracting said rim, as shown in Fig. 3.

The pivot end of the link is preferably mounted in a recessed block 15, while the other end or ring of said link and cam operating therein are mounted in a housing 16, the block and housing being formed on or secured to the opposite ends of the supplemental rim, respectively. The housing 16 is provided with projecting arms 17, which embrace the opposite sides of the block and serve as guides for keeping the ends of the rim in proper alinement at all times. For the purpose of locking the eccentric and ring in either position to which it may be turned I provide a set-screw 18, which is threaded through one side of the housing 16 and is adapted to impinge against a flattened surface, as 19, at one side of the ring. The wall 16ª of the housing, opposite the set-screw, is thickened as shown, so that the ring will abut thereagainst, whereby the cam may be turned back and forth in but one direction or toward the set-screw, and when the set-screw is turned down against the ring the parts will be locked.

One of the metal rims, as 8, is provided with short pins or studs 20, adapted to engage openings 21 in the other rim, 6, to prevent lateral movement of the tire and supplemental rim on the wheel when said parts are clamped thereon, similar studs and openings being provided at the other side of the wheel, for the same purpose, and in order to permit of the expansion and contraction of the supplemental rim the openings 21 near the meeting ends of said rim are elongated, as shown in Fig. 1. To prevent the tire from being pinched between the meeting ends of the supplemental rim during the contraction of said rim I provide a thin metal plate 23, which covers the joint, said plate having inturned flanges 24 corresponding with the flanges 9 and lying within the same.

The wooden felly and its metal rim are provided with the usual opening (not shown) to receive the valve of the tire, said opening being preferably located at the opposite side of the wheel from the recess 7, for convenience in fitting the valve therein, it being understood that the recess is provided to receive the housing and block at the meeting ends of the supplemental rim. The wooden felly and metal rim thereon are also provided with an opening 22, into which a key may be inserted and fitted in the socketed end of the pivot 14 for turning the eccentric or cam, and as both ends of the supplemental rim move to and from each other in the contraction and expansion of said rim the said opening 22 is elongated longitudinally of the felly.

In the operation of applying a tire having the improved supplemental rim hereinbefore described, said rim is first expanded so that it may be easily fitted on the wheel, and as the inflated tire exerts a tendency to contract the rim the latter is locked in expanded position by means of the set-screw 18 (see dotted lines Fig. 2). The vehicle wheel being now positioned with the recess 7 uppermost the tire and its rim are fitted on the lower part of the wheel, inserting the valve in the opening in the felly and the studs in the openings or recesses in the rim of the felly, after which the upper part of the tire and supplemental rim are slipped upon the upper part of the wheel, the block and housing entering recess 7 and the studs 20 sprung into engagement with the recesses or openings 21. The set-screw 18 is then loosened so that the cam may be turned, a key is inserted in opening 22 and the cam turned to contract and tightly clamp the supplemental rim on the wheel, after which the parts are again locked by the set-screw. The tire being already inflated the wheel is ready for immediate use. As will be obvious, the operation of detaching or demounting a tire is simply the reverse of the operation described for mounting a tire, and it will also be obvious that the entire operation of removing a damaged tire and applying a new one may be effected in a very short time.

Having thus described my invention, what I claim as new and desire to secure by Letters-Patent, is:—

1. The combination with a vehicle-wheel and tire, of a supplemental rim to which the tire is attached split transversely to form ends which are movable to and from each other for expanding and contracting the rim on the wheel, a link connecting the ends of the rim and having a ring at one end, a cam operating in said ring to draw the ends of the rim together, a wall engaging one side of the ring to limit the throw of the parts in that direction, and a set-screw threaded in the rim and adapted to impinge against the other side of the ring, substantially as shown and for the purpose set forth.

2. The combination with a vehicle-wheel and tire, the periphery of the wheel having recesses therein, of a supplemental rim to which the tire is attached split transversely to form ends which are movable to and from each other for expanding and contracting the rim on the wheel, studs on the inner side of the supplemental rim adapted to take into the recesses in the periphery of the wheel, a link connecting the ends of the rim and having a ring at one end, a cam operating in said ring to draw the ends of the rim together, and a set-screw threaded in the rim to impinge against the ring for locking the parts, substantially as shown and for the purpose set forth.

3. The combination with a vehicle-wheel and tire, the periphery of the wheel having the recesses 7 and 21, of a supplemental rim to which the tire is attached split transversely to form ends which are movable to and from each other for expanding and contracting the rim on the wheel, studs on the inner side of the rim adapted to take into the recesses 21, and housings at the ends of the rim adapted to take into the recess 7; together with a link pivoted at one end in one of the housings and having a ring located in the other housing, a cam in the latter housing operating in the ring to actuate the link, and a set-screw threaded in said housing to bear upon the ring and lock the parts, substantially as shown and described.

4. The combination with a vehicle-wheel and tire, the periphery of the wheel having a recess therein, of a supplemental rim to which the tire is attached split transversely to form ends which are movable to and from each other for expanding and contracting the rim on the wheel, a rectangular housing at one end of the rim, and a housing on the other end of the rim having spaced apart arms adapted to embrace the rectangular housing to keep the ends of the rim in alinement; together with a link pivoted in one of the housings and having a ring located in the other housing, a cam in the latter housing operated in the link to actuate the latter, and means for locking the parts, substantially as shown and described.

In testimony whereof I have signed my name to this specification in the presence of two subscribing witnesses.

VALENTINE WILDNER.

Witnesses:
CHRISTIAN WILDNER,
ROBERT C. BUSSE.